United States Patent Office 3,770,805
Patented Nov. 6, 1973

3,770,805
NITRO-SUBSTITUTED BUTYL ESTER
Albert L. Rocklin, Walnut Creek, Calif., assignor to Shell Oil Company, New York, N.Y.
No Drawing. Filed Oct. 12, 1970, Ser. No. 81,632
Int. Cl. C07c *101/10*
U.S. Cl. 260—482 R          1 Claim

ABSTRACT OF THE DISCLOSURE

The novel 4,4,4-trinitrobutyl α,β-bis(difluoramino)isobutyrate and its use as a high-energy plasticizer of polymeric binders for solid propellant systems.

---

The invention herein described was made in the course of or under a contract or subcontract thereunder, with the United States Air Force.

BACKGROUND OF THE INVENTION

High-energy polymers used as high-energy binders for solid propellant systems are generally viscous liquids which require a plasticizer in order to mix, cast, and cure to propellants with acceptable physical properties. Difluoramino-containing compounds which are per se energetic have been used as plasticizers. Since difluoramino compounds tend to be highly sensitive to shock and friction, it would be advantageous to minimize this unwelcome contribution to the hazards of propellant formulation by having available a highly energetic difluoramino plasticizer having reduced sensitivity. It would be of further advantage to obtain a plasticized high-energy binder polymeric composition, i.e., a composition of polymer containing said plasticizer, which has improved properties and improved performance in cured systems.

SUMMARY OF THE INVENTION

It has now been found that the novel, 4,4,4-trinitrobutyl α,β-bis(difluoramino)isobutyrate of the formula

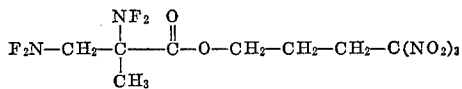

is a highly energetic nitro-difluoramino plasticizer having reduced sensitivity.

PREFERRED EMBODIMENTS OF THE INVENTION

The novel 4,4,4 - trinitrobutyl α,β-bis(difluoramino) isobutyrate of the invention is an ester produced by the reaction of tetrafluorohydrazine, $N_2F_4$, with the unsaturated ester 4,4,4-trinitrobutyl methacrylate. The trinitrobutyl methacrylate starting reactant is produced by the direct reaction between 4,4,4-trinitro-1-butanol and methacrylyl chloride in the presence of a trace of a polymerization inhibitor. This nitroalkyl methacrylate reagent preferably is purified by distillation, e.g., in a concentric type molecular still, prior to commencing the difluoramination reaction with tetrafluorohydrazine.

The 4,4,4-trinitro-1-butanol required for the production of the above mentioned 4,4,4-trinitrobutyl methacrylate is produced in a two-step reaction in which 4,4,4-trinitrobutylraldehyde is prepared by Michael addition of nitroform to acrolein, followed by sodium borohydride reduction of said nitroaldehyde to the desired nitroalcohol. Preferably the two-step synthesis is carried out in the presence of an inert solvent so that the 4,4,4-trinitro-1-butanol is available for the subsequent esterification in the form of a solution. If desired additional purification of the 4,4,4-trinitro-1-butanol solution is obtained by water washing, followed by drying. An advantage of utilizing the 4,4,4-trinitro-1-butanol in the form of a solution is that the production can proceed from nitroform to the ultimate esterification product without having to isolate, for example, by distillation, the impact-sensitive intermediates, 4,4,4 - trinitrobutyraldehyde and 4,4,4-trinitro-1-butanol. However, when desired, the 4,4,4-trinitro-1-butanol can be obtained in satisfactory purity as a bottoms product by removal of the solvent, e.g., by stripping off the solvent, and then heating to about 120° C. at reduced pressure, such as from about 1 to 50 mm. Hg, to remove substantially the last traces of solvent.

The addition of tetrafluorohydrazine to 4,4,4-trinitrobutyl methacrylate takes place in high yield and can be accomplished conveniently in a batchwise or continuous manner. The temperature at which the addition is conducted is from about 60° C. to about 110° C., preferably at about 80° C. The resulting 4,4,4-trinitrobutyl α,β-bis-(difluoramino)isobutyrate is purified by conventional means such as fractional distillation, fractional crystallization, and the like. A preferred method of purification producing a product of high purity of advantageous properties is treating the difluoraminated ester with an adsorbent material. A solution of the difluoraminated ester in an inert solvent is passed through a body of adsorbent material, preferably maintained in subdivided form. Exemplary of suitable adsorbent materials for use in this convenient purification method are silica gels, activated carbon, cationic ion exchange resins such as Amberlyst 15 (Rohm and Haas Co.), molecular sieves and the like; particularly preferred are the silica gels, molecular sieves and ion exchange resins. The recovery of the purified ester of the invention from the treated solution is conveniently carried out by conventional means such as solvent stripping, fractional distillation, and the like.

Exemplary of the inert solvents suitable in the above-mentioned synthetic and purification procedures are normally liquid aromatic hydrocarbons, such as benzene, toluene, and xylene; normally liquid ethers, including dialkyl ethers such as diethyl ether, dibutyl ether, and methyl hexyl ether; alkyl aryl ethers such as anisole and phenyl butyl ether; cyclic ethers such as tetrahydrofuran, dioxane, and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether, and glycerol triethyl ether; and halogenated hydrocarbons such as dichloromethane, chloroform, carbon tetrachloride, dichloroethane, tetrachloroethane, bromoform, dibromomethane, chloropropane, bromobutane, 1-chloro-2,2-difluoroethane, chloropentane, chlorobenzene, chlorocyclohexane, and the like. A particularly preferred group of solvents includes halogenated hydrocarbons of 1 to 6 carbon atoms, especially chlorohydrocarbons, and most preferred is 1,2-dichloroethane. The solvent is employed in molar excess over the amount of reactants and/or product, and in general, moles of solvent up to about 150 moles per mole of reactants and/or product are satisfactory.

4,4,4-trinitrobutyl α,β-bis(difluoramino)isobutyrate is utilized with advantage as a plasticizer of polymeric binders for solid propellant systems. It is especially useful when combined with poly[1,2-bis-(difluoramino)-2,3-epoxypropane], which is a family of hydroxyl-terminated polyethers with a repeating unit of

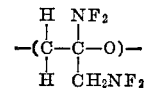

and is described in copending application of Walter L. Petty, U.S. Ser. No. 660,545, filed July 12, 1967. A particularly desirable composition is that wherein the weight ratio of 4,4,4-trinitrobutyl α,β-bis(difluoramino)isobutyrate plasticizer to poly[1,2-bis(difluoramino)-2,3-epoxypropane] binder is about 1:1, i.e., about 50/50 wt. percent. A property of advantage exhibited by 4,4,4-trinitrobutyl α,β-bis(difluoramino)isobutyrate is its lower vapor pressure, e.g., as compared with similar plasticizers of lower molecular weight. Hence, when it is used as a plasticizer, it does not tend to be lost from the propellant by evaporation, as is the case with more volatile plasticizers. Propellants formulated from 4,4,4-trinitrobutyl α,β-bis-(difluoramino)isobutyrate-plasticizer poly[1,2-bis(difluoramino) - 2,3 - epoxypropane] exhibit superior properties such as improved retention of plasticity on standing, without hardening, cracking and/or malfunctioning of the solid propellant, and such formulations yield propellant systems which are highly stable thermally. Other commonly used difluoramino pasticizers do not contain enough oxidizing groups for complete self-combustion and must rely upon oxygen from ammonium perchlorate or other oxidizer to make up this deficiency. The 4,4,4-trinitrobutyl α,β-bis(difluoramino)isobutyrate plasticizer of the invention having a higher concentration of active oxidizing groups minimizes this deficiency when combined with poly[1,2-bis(difluoramino)-2,3-epoxypropane] and produces a higher performance potential when formulated into advanced propellant systems, for example, those using metal hydrides as fuel.

Example 1

4,4,4-trinitrobutyraldehyde was prepared by the Michael addition of nitroform to acrolein. A 20% solution of nitroform in dichloromethane to which a quarter volume of water was added and an approximately equimolar amount of acrolein were mixed together and maintained at about 10° C. with stirring for 3 to 5 hours. Then the volatiles from the reaction mixture were removed by vacuum evaporation down to 1 mm. Hg at 40° C. The residue containing mainly 4,4,4-trinitrobutyraldehyde is used directly in the following reduction reaction.

One mole (207 g.) of 4,4,4-trinitrobutyraldehyde in the form of the above residue was slowly added over a half-hour to a freshly prepared suspension of 11 g. (0.275 mole) sodium borohydride in 400 ml. ethanol precooled to 0° C. External cooling was required to keep the temperature at 0° C. As noon as the exotherm was over (shortly after completion of the addition), the volatiles were vacuum evaporated down to 2 mm. Hg at 30° C. To the residue, containing sodium borate, 300 ml. dichloromethane and a like volume of water were added and the layers separated. The water layer was extracted with 50 ml. dichloromethane and the combined non-aqueous extracts were dried over anhydrous magnesium sulfate and the solvent evaporated. The residue was then distilled. After a small forecut, practically all the charge distilled at 78° C. and 20μ. The yield was 183.1 g. of 4,4,4-trinitro-1-butanol.

Example 2

Ten grams of 4,4,4-trinitro-1-butanol was refluxed in 40 ml. of 1,2-dichloroethane with 10 ml. of freshly distilled methacrylyl chloride in the presence of a few crystals of diphenylpicrylhydrazyl for inhibiting polymerization. The top of the reflux condenser was continuously purged with nitrogen to remove hydrogen chloride. Infrared analysis showed that most of the alcohol had been used up after 4 hours; an additional 4 hours reduced the alcohol concentration to a trace. The 1,2-dichloroethane solvent and unreacted methacrylyl chloride were stripped off at 90° C., first at 100 mm. and then at 10 mm. There remained 13.4 g. amber liquid (theor. 13.25 g.). The product was successfully distilled in small portions in a concentric Hickman-type still yielding as distillate 4,4,4-trinitrobutyl methacrylate shown to be >98% pure by proton nuclear magnetic resonance spectrum analysis.

Example 3

A solution of 2.0 g. 4,4,4-trinitrobutyl methacrylate in 40 ml. of 1,2-dichloroethane was heated to 80° C. for 7 hours under 330 p.s.i.g. of tetrafluorohydrazine in a pressure vessel. After washing the solution for 30 minutes with aqueous sodium bicarbonate, drying and stripping off solvent to final conditions of 65° C. at <2 mm. Hg, there remained 2.64 g. (96%) amber liquid whose weight remained constant after prolonged stripping. Rectification by chromatography on an 18-in. x ¾-in. column packed with silica gel, using 1,2-dichloroethane as eluent, provided 2.11 g. (77%) of yellow liquid 4,4,4-trinitrobutyl α,β-bis(difluoramino)isobutyrate whose proton nuclear magnetic resonance spectrum was free from impurities.

*Analysis.*—Calculated for $C_8H_{11}N_5O_8F_4$ (percent): C, 25.2; H, 2.9; N, 18.4; F, 20.0. Found (percent): C, 24.8; H, 3.3; N, 17.3; F, 21.2.

The nuclear magnetic resonance and infrared spectra are consistent with the assigned structure.

Whereas the impact sensitivity of many energetic plasticizers may vary from about 2 to about 15 kg.-cm. as measured by the Olin-Mathieson closed-cup impact testing method where increasing values indicate increasing stability (e.g., nitroglycerin has a value of 2), 4,4,4-trinitrobutyl α,β-bis(difluoramino)isobutyrate gives a negative impace test result even at greater than 100 kg.-cm.

Gas evolution in a 200-hour thermal stability test at 80° C. is 0.3 ml./g./100 hr. for 4,4,4-trinitrobutyl α,β-bis(difluoramino)isobutyrate, and 2.0 ml./g./100 hr. for a 1:1 mixture by weight of 4,4,4-trinitrobutyl α,β-bis(difluoramino)isobutyrate with the polymeric binder, poly-[1,2-bis(difluoramino)-2,3-epoxypropane] of molecular weight of about 3700 as determined by vapor phase osmometer. Gas evolution of the aforementioned unplasticized binder in the same test is in the range of from 3 to 6 ml./g./100 hr.

I claim as my invention:
1. 4,4,4-trinitrobutyl α,β-bis(difluoramino)isobutyrate.

References Cited

UNITED STATES PATENTS 3,346,621  10/1967  Petry et al. _____ 260—482 R
3,436,419   4/1969  Rhodes _____ 260—482 R X LELAND A. SEBASTIAN, Primary Examiner U.S. Cl. X.R.

149—19, 88